(12) United States Patent
Borgmann et al.

(10) Patent No.: US 9,802,368 B2
(45) Date of Patent: Oct. 31, 2017

(54) METHODS AND SYSTEMS FOR MANUFACTURING ADVANCED COMPOSITE COMPONENTS

(71) Applicant: Dieffenbacher GmbH Maschinen- und Anlagenbau, Eppingen (DE)

(72) Inventors: Robert E. Borgmann, Maineville, OH (US); Wendell Beachy, Delaware, OH (US); Don O. Evans, Post Falls, ID (US); Christina M. McClard, Fort Collins, CO (US)

(73) Assignee: DIEFFENBACHER GMBH MASCHINEN-UND ANLAGENBAU, Eppingen (DE)

( * ) Notice: Subject to any disclaimer, the term of this patent is extended or adjusted under 35 U.S.C. 154(b) by 0 days.

(21) Appl. No.: 15/446,885

(22) Filed: Mar. 1, 2017

(65) Prior Publication Data
US 2017/0173897 A1 Jun. 22, 2017

Related U.S. Application Data

(62) Division of application No. 14/274,444, filed on May 9, 2014, now Pat. No. 9,597,842.
(Continued)

(51) Int. Cl.
*B29C 70/30* (2006.01)
*B29C 70/38* (2006.01)
(Continued)

(52) U.S. Cl.
CPC ............ *B29C 70/384* (2013.01); *B29C 35/02* (2013.01); *B29C 70/545* (2013.01); *B29C 70/30* (2013.01);
(Continued)

(58) Field of Classification Search
None
See application file for complete search history.

(56) References Cited

U.S. PATENT DOCUMENTS 3,808,040 A 4/1974 Barnes et al.
4,028,158 A 6/1977 Hipchen et al.
(Continued)

FOREIGN PATENT DOCUMENTS

CN 101861242 A 10/2010
CN 201950820 U 8/2011
(Continued)

OTHER PUBLICATIONS

Office Action (and English translation) in Korean Application No. 2010-7007753 dated Aug. 2, 2013.
(Continued)

*Primary Examiner* — Linda L Gray
(74) *Attorney, Agent, or Firm* — Foley & Lardner LLP

(57) ABSTRACT

A fiber placement system for manufacturing composite components includes at least one material storage enclosure including a material spool assembly, a swiveling roller assembly, and a redirect roller assembly, for each tow to be produced per course, at least one material feeding/cutting station configured with a nip roller drive system, and a cutting mechanism, at least one material transfer station configured with an individual, moveable guide tray for each tow to be produced per course, the moveable guide trays respectively being configured with a vacuum system, and at least one layup station comprising a vacuum table/layup surface, and a pick-and-place device equipped with an end-effector.

10 Claims, 9 Drawing Sheets

Related U.S. Application Data

(60) Provisional application No. 61/777,370, filed on Mar. 12, 2013.

(51) Int. Cl.
   *B29C 35/02* (2006.01)
   *B29C 70/54* (2006.01)

(52) U.S. Cl.
   CPC ....... *B29C 70/386* (2013.01); *Y10T 156/1062* (2015.01); *Y10T 156/1074* (2015.01); *Y10T 156/1077* (2015.01); *Y10T 156/1092* (2015.01); *Y10T 156/125* (2015.01); *Y10T 156/13* (2015.01); *Y10T 156/1322* (2015.01); *Y10T 156/1348* (2015.01)

(56) References Cited

U.S. PATENT DOCUMENTS

| | | | |
|---|---|---|---|
| 4,092,453 | A | 5/1978 | Jonda |
| 4,556,440 | A | 12/1985 | Krueger |
| 4,567,738 | A | 2/1986 | Hutson et al. |
| 4,600,456 | A | 7/1986 | Oswald |
| 4,848,066 | A | 7/1989 | Luhman |
| 5,269,863 | A | 12/1993 | Middelman |
| 5,308,424 | A | 5/1994 | Sasaki et al. |
| 5,368,913 | A | 11/1994 | Ortega |
| 5,445,693 | A | 8/1995 | Vane |
| 6,575,218 | B1 | 6/2003 | Burns et al. |
| 6,607,626 | B2 | 8/2003 | Taggart |
| 6,939,423 | B2 | 9/2005 | Taggart |
| 7,008,495 | B2 | 3/2006 | Mancini |
| 7,094,310 | B2 | 8/2006 | Yamaguchi et al. |
| 7,235,149 | B2 | 6/2007 | Taggart |
| 8,007,894 | B2 | 8/2011 | Taggart |
| 8,048,253 | B2 | 11/2011 | Cramer et al. |
| 8,168,029 | B2 | 5/2012 | Cramer et al. |
| 8,414,729 | B2 | 4/2013 | Cramer et al. |
| 8,567,469 | B2 | 10/2013 | Meyer et al. |
| 2003/0104746 | A1 | 6/2003 | Menzies et al. |
| 2003/0209317 | A1 | 11/2003 | Koehler et al. |
| 2005/0178507 | A1 | 8/2005 | Hajny et al. |
| 2006/0048881 | A1 | 3/2006 | Evans et al. |
| 2006/0249868 | A1 | 11/2006 | Brown et al. |
| 2009/0095410 | A1 | 4/2009 | Oldani |
| 2009/0101277 | A1 | 4/2009 | Cramer et al. |
| 2011/0152051 | A1 | 6/2011 | Murray |
| 2012/0018097 | A1 | 1/2012 | Cramer et al. |
| 2012/0186749 | A1 | 7/2012 | Cramer et al. |
| 2013/0186557 | A1 | 7/2013 | Cramer et al. |
| 2013/0276954 | A1 | 10/2013 | Cramer et al. |
| 2014/0109365 | A1 | 4/2014 | Sutton et al. |

FOREIGN PATENT DOCUMENTS

| | | | |
|---|---|---|---|
| CN | 103552253 | A | 2/2014 |
| DE | 1020100 44 721 | A1 | 3/2012 |
| DE | 1020111 09 698 | A1 | 2/2013 |
| EP | 2 418 071 | A1 | 2/2012 |
| EP | 2 639 049 | A1 | 9/2013 |
| JP | 48-002902 | | 1/1973 |
| JP | 04-268342 | | 9/1992 |
| JP | 07-214714 | | 8/1995 |
| JP | 2003-136634 | | 5/2003 |
| JP | 2004-042277 | | 2/2004 |
| JP | 2004-218133 | | 8/2004 |
| JP | 2008-308301 | A | 12/2008 |
| WO | WO-85/04838 | | 11/1985 |
| WO | WO-2014/140146 | | 9/2014 |

OTHER PUBLICATIONS

Non-Final Office Action in U.S. Appl. No. 14/274,444 dated Jun. 30, 2016. 15 pages.
Notice of Allowance in U.S. Appl. No. 14/274,444 dated Nov. 7, 2016. 7 pages.
Office Action (and English translation) in Japanese Application No. 2013-183812 dated Aug. 19, 2014.
International Search Report in PCT/US01/23757 dated Nov. 16, 2001.
Office Action in U.S. Appl. No. 10/443,964 dated Jul. 29, 2004.
Communication pursuant to Article 96(2) EPC in Appln No. 01 959 289.8 dated Dec. 22, 2006.
Office Action in U.S. Appl. No. 11/798,823 dated Feb. 18, 2009.
International Search Report & Written Opinion in PCT/US2008/011231 dated Mar. 23, 2009.
Office Action in U.S. Appl. No. 11/798,823 dated Jul. 8, 2009.
Notification of Reasons for Rejection in JP Appln No. 2002-516088 mailed Dec. 15, 2009.
Office Action in U.S. Appl. No. 11/798,823 dated Jan. 25, 2010.
International Preliminary Report on Patentability in PCT/US2008/011231 dated Mar. 30, 2010.
Office Action in U.S. Appl. No. 11/798,823 dated May 27, 2010.
Office Action in U.S. Appl. No. 12/237,077 dated Jul. 28, 2010.
Office Action in U.S. Appl. No. 12/237,077 dated Oct. 20, 2010.
Interview Summary in U.S. Appl. No. 12/237,077 dated Dec. 17, 2010.
Office Action in U.S. Appl. No. 11/798,823 dated Dec. 22, 2010.
Office Action in U.S. Appl. No. 12/237,077 dated Feb. 4, 2011.
Extended EP Search Report in EP Appln No. 10185499 dated Apr. 8, 2011.
Notice of Allowance in U.S. Appl. No. 11/798,823 dated Apr. 20, 2011.
Office Action in U.S. Appl. No. 13/435,006 dated Jun. 1, 2012.
International Search Report & Written Opinion in PCT/US2012/48252 dated Dec. 19, 2012.
Notice of Reasons for Refusal in JP Appln No. 2010-526965 mailed Jan. 29, 2013.
International Search Report in PCT/EP2014/054908 mailed Jul. 24, 2014.
Office Action in U.S. Appl. No. 13/557,621 dated Nov. 5, 2014.
Notice on the First Office Action (with English Translation) received in Chinese Patent Application No. 201480014551.1, dated Dec. 20, 2016, 12 pages.

METHODS AND SYSTEMS FOR MANUFACTURING ADVANCED COMPOSITE COMPONENTS

CROSS-REFERENCE TO RELATED APPLICATIONS

This application is a divisional of U.S. patent application Ser. No. 14/274,444 filed on May 9, 2014, which claims the benefit of U.S. Provisional Application No. 61/777,370 filed on Mar. 12, 2013, both of which are hereby incorporated by reference in their entirety.

This application is related to U.S. Pat. No. 6,607,626, issued Aug. 19, 2003; U.S. Pat. No. 6,939,423, issued Sep. 6, 2005; U.S. Pat. No. 7,235,149, issued Jun. 26, 2007; U.S. Pat. No. 8,007,894, issued Aug. 30, 2011; U.S. Pat. No. 8,048,253, issued Nov. 1, 2011; U.S. Pat. No. 8,168,029, issued May 1, 2012; U.S. patent application Ser. No. 13/435,006, filed Mar. 30, 2012; U.S. patent application Ser. No. 13/557,621, filed Jul. 25, 2012; and PCT/EP2014/054908, filed Mar. 13, 2014, all of which are hereby incorporated by reference in their entirety.

FIELD OF THE INVENTION

The present invention relates generally to the manufacture of advanced composite components. More specifically, the present invents relates to methods and systems for manufacturing advanced composite components by means of an automated fiber placement process, utilizing unidirectional prepreg composite materials.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Conventional fiber placement systems are typically optimized to produce very large and often highly contoured parts that receive little or no post forming prior to curing. The resulting conventional design configurations may present significant disadvantages when used to produce small, substantially flat part blanks, as explained below:

Minimum Course Length (MCL):

Conventional fiber placement systems apply each course of material to the work surface in a more or less continuous fashion, by feeding the tows from the material spools through a complex fiber delivery path, into the nip point of a roller riding along the work surface. This requires that the mechanisms for cutting each tow to the required length be located on the dispensing head, as close to the nip roller as possible. The distance between the cutting mechanism and the nip point at the roller determines the length of the shortest tow (or course) that can be produced and laid. A longer minimum course length dimension thus increases the amount of scrap to be removed during the trimming operation. The minimum course length attainable with the conventional fiber placement configuration may therefore be too long to be practical for producing very small, flat parts.

Complex Tension Control:

Because conventional systems apply each course of material to the work surface in a more or less continuous fashion, each tow must necessarily travel a significant distance from the material spool to the dispensing head, while undergoing the stresses imposed by the repeated bending and twisting required along the path. Because the speed of the tow through the fiber delivery system must match the laydown rate of the material on the work surface, the operations for feeding and cutting each tow to length are typically executed on the fly. These conditions mandate the use of a sophisticated and expensive system for controlling the tension in each individual tow. The costs associated with such a tension control system make a conventional fiber placement system impractical as an alternative to hand layup for producing very small, substantially flat parts.

Contoured Layup Capability:

The configuration of conventional fiber placement systems is driven in part by the need to be able to apply a course of material to work surfaces having fairly complex contours. The requirement for such a capability influences the design in a number of significant ways, the net effect of which drives a system design that is too complex and expensive to be a viable alternative to the hand layup process for small, substantially flat parts, for example:

Conventional systems typically require a dispensing head design that permits each individual tow to be able to be paid out individually while at full layup speed, so as to be better able to conform to the contours of the work surface;

Conventional systems typically require a complex nip roller design with sufficient compliance to accommodate abrupt, localized changes in contour;

Conventional systems typically require a high-powered source of process heat to tackify the part surface on the fly at full layup speed; and Conventional systems typically require a relatively large manipulator with 6 (and in some cases, 7) degrees of freedom in order to be able to apply a course of material onto the work surface at the correct orientation and path, with sufficient mold clearance.

A need exists for improved technology, including technology for efficiently producing advanced composite part blanks, especially small, substantially flat advanced composite part blanks.

SUMMARY

Embodiments provide methods, systems, and devices for manufacturing advanced composite components by means of an automated fiber placement process, utilizing unidirectional prepreg composite materials. Embodiments described herein may provide means for efficiently producing small, substantially flat net-shape composite laminates, which may then be post formed and cured after layup. Typically, such parts have been produced via conventional hand layup methods. In contrast, embodiments provide an automated process in a cost-effective manner, to improve the consistency of part quality, reduce cost, and increase throughput. Embodiments may apply to the efficient manufacture of both thermoset-based and thermoplastic-based composite materials. However, for illustrative purposes, embodiments described in detail herein focus on unidirectional thermoset prepreg composite materials.

One embodiment of the invention relates to a method of manufacturing composite components using a fiber placement system, the system comprising:

at least one material storage enclosure including a material spool assembly, a swiveling roller assembly, and a redirect roller assembly, for each tow to be produced per course;

at least one material feeding/cutting station configured with a nip roller drive system, and a cutting mechanism;

at least one material transfer station configured with an individual, moveable guide tray for each tow to be produced per course, the moveable guide trays respectively being configured with a vacuum system; and at least one layup station comprising a vacuum table/layup surface, and a pick-and-place device equipped with an end-effector, the method comprising the steps of:

activating the nip roller drive system for pulling each lane of material forward through its respective swiveling rollers and redirect rollers so that each lane of material is fed forward beyond the cutting mechanism and on into its respective guide tray located in the at least one material transfer station;

after each lane having been fed a desired distance into its respective guide tray, activating the vacuum system of each respective moveable guide tray, causing each lane of material to be held in position;

after causing each lane of material to be held in position in its respective moveable guide tray, actuating the cutting mechanism for severing each lane of material from the material being fed from the material supply spools and thereby creating individual tows;

with each lane of material held in position in its respective moveable guide tray, moving the moveable guide trays horizontally, in the direction away from cutting mechanism, thereby making all of the tows accessible by the pick-and-place device;

rotating the end-effector of the pick-and-place device into alignment with the moveable guide trays;

lowering the end-effector into contact with the tows;

activating the end-effector;

deactivating the vacuum system in the moveable guide trays;

retracting the end-effector of the pick-and-place device, so as to lift the tows away from the moveable guide trays;

positioning the end-effector of the pick-and-place device above the vacuum table/layup surface;

lowering the end-effector of the pick-and-place device so as to place the tows into contact with a previously laid ply on the vacuum table/layup surface;

deactivating the end-effector of the pick-and-place device; and retracting the end-effector of the pick-and-place device, leaving the tows in position atop the previously laid ply on vacuum table/layup surface.

Another embodiment of the invention relates to a fiber placement system. The fiber placement system comprises:

at least one material storage enclosure including a material spool assembly, a swiveling roller assembly, and a redirect roller assembly, for each tow to be produced per course;

at least one material feeding/cutting station configured with a nip roller drive system, and a cutting mechanism;

at least one material transfer station configured with an individual, moveable guide tray for each tow to be produced per course, the moveable guide trays respectively being configured with a vacuum system; and at least one layup station comprising a vacuum table/layup surface, and a pick-and-place device equipped with an end-effector; wherein the nip roller drive system is adapted to be activated and to pull each lane of material forward through its respective swiveling rollers and redirect rollers, so that each lane of material may be fed forward beyond the cutting mechanism and on into its respective guide tray located in the at least one material transfer station;

the vacuum system of each respective moveable guide tray is adapted to be activated, for causing each lane of material to be held in position within its respective moveable guide tray, the cutting mechanism is adapted to be actuated, for severing each lane of material from the material being fed from the material supply spools and thereby creating individual tows, the moveable guide trays are adapted to be moved horizontally, in the direction away from cutting mechanism, for making all of the tows accessible by the pick-and-place device, the pick-and-place device is adapted to rotate the end-effector into alignment with the moveable guide trays, lower the end-effector into contact with the tows, and activate the end-effector, the vacuum system in the moveable guide trays is adapted to be deactivated and the pick-and-place device is adapted to retract the end-effector, so as to lift the tows away from the moveable guide trays, the pick-and-place device is adapted to position the end-effector above the vacuum table/layup surface, and to lower the end-effector so as to place the tows into contact with a previously laid ply on the vacuum table/layup surface; and the pick-and-place device is adapted to retract the end-effector, leaving the tows in position atop the previously laid ply on vacuum table/layup surface.

Additional features, advantages, and embodiments of the present disclosure may be set forth from consideration of the following detailed description, drawings, and claims. Moreover, it is to be understood that both the foregoing summary of the present disclosure and the following detailed description are exemplary and intended to provide further explanation without further limiting the scope of the present disclosure claimed.

BRIEF DESCRIPTION OF THE DRAWINGS

The embodiments can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
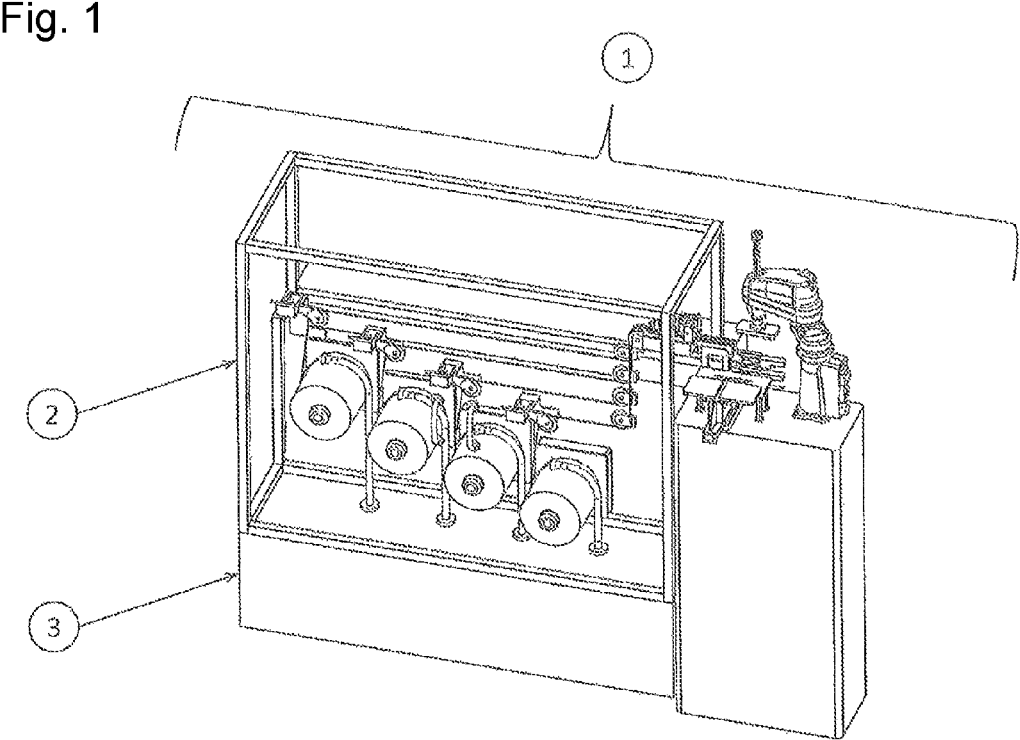
FIG. 1 is a schematic diagram of an exemplary fiber placement cell according to an embodiment.
Figure 2:
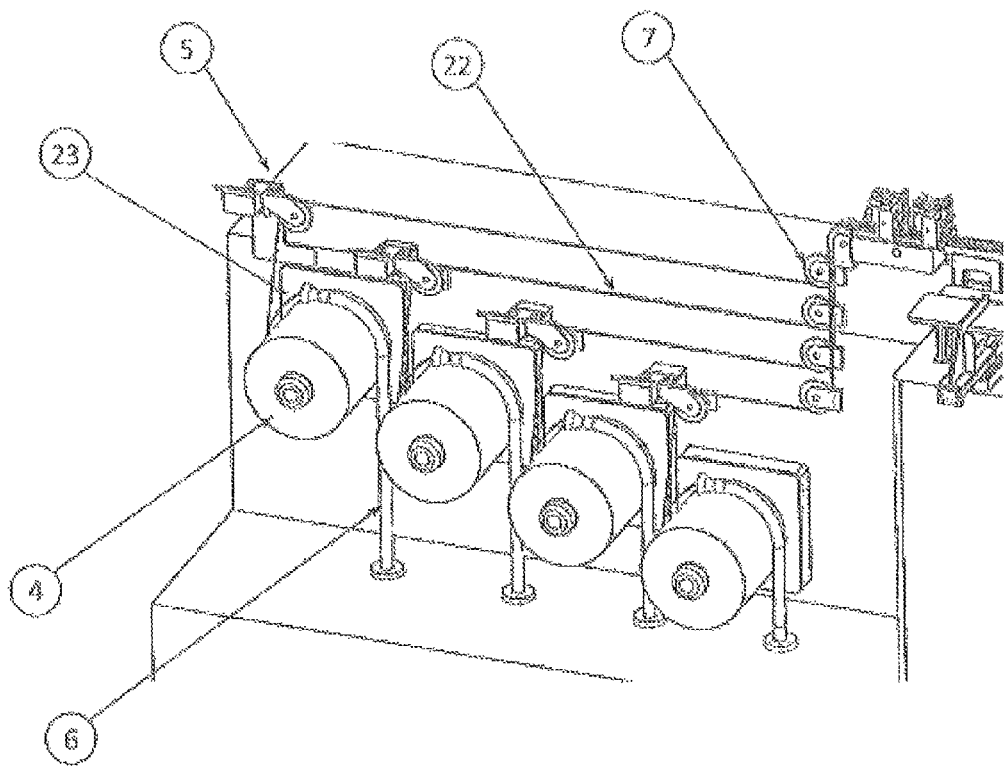
FIG. 2 is a schematic diagram of exemplary components of an exemplary material storage enclosure according to an embodiment.
Figure 3:
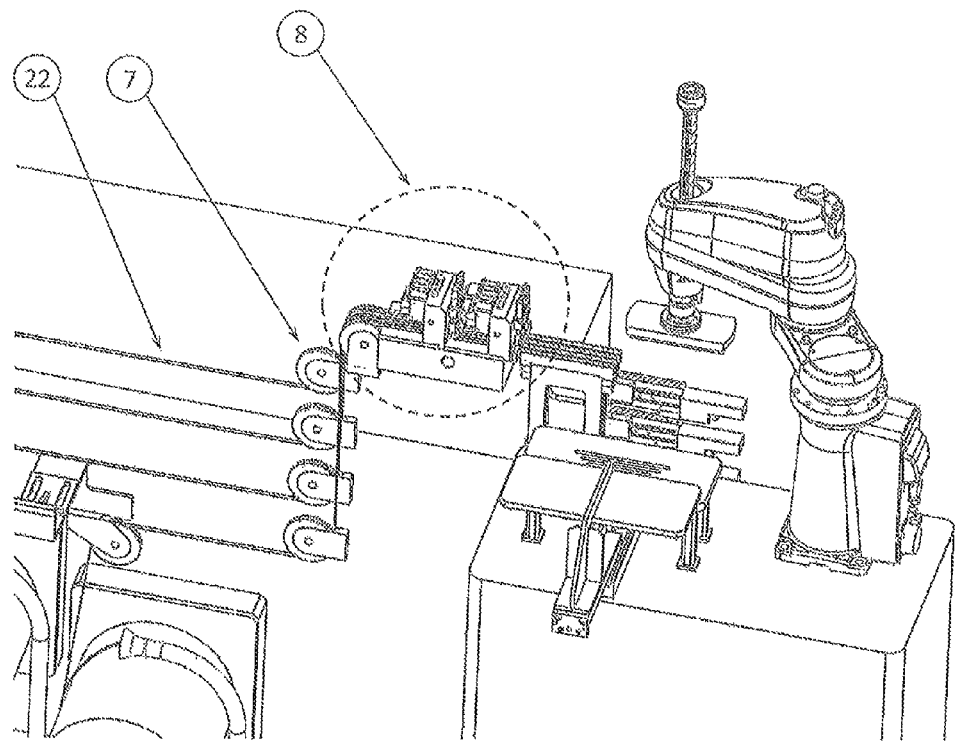
FIG. 3 is a schematic diagram of an exemplary material feeding/cutting station and redirect roller assembly according to an embodiment.
Figure 4:
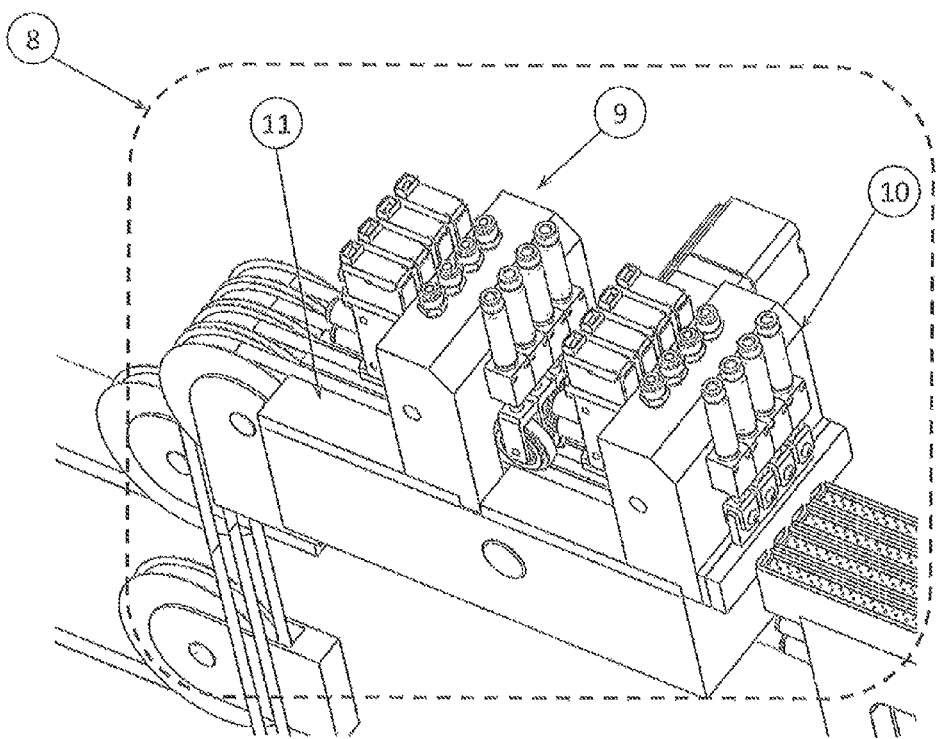
FIG. 4 is a schematic diagram of a detailed view of the exemplary material feeding/cutting station of FIG. 3.
Figure 5:
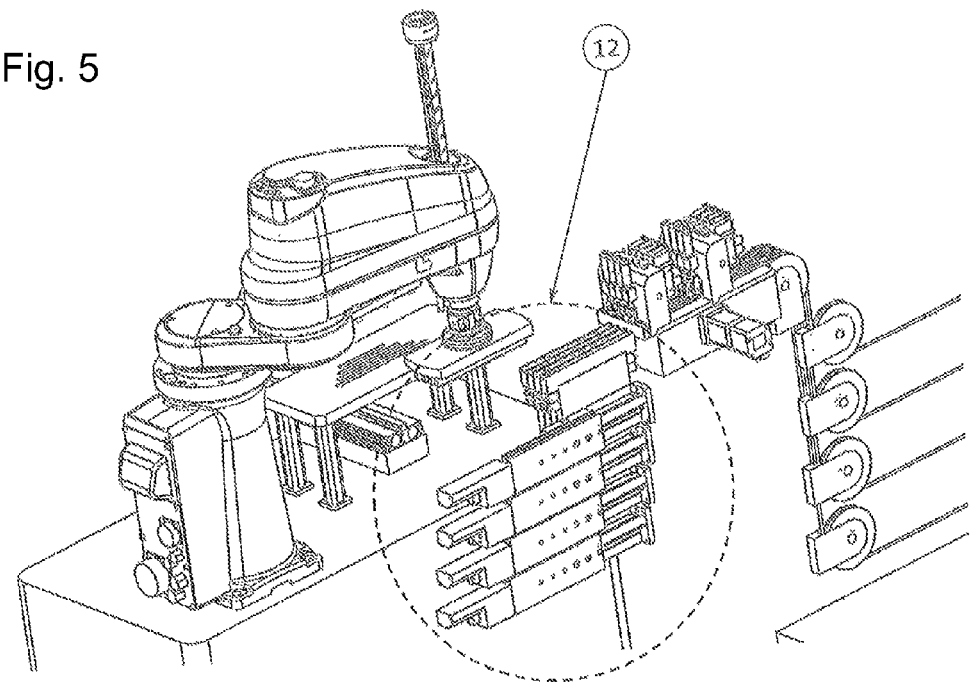
FIG. 5 is a schematic diagram of an exemplary material transfer station according to an embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Embodiments provide methods, systems, and devices for manufacturing advanced composite components by means of an automated fiber placement process, utilizing unidirectional prepreg composite materials.

Referring to FIGS. 1-15, in embodiments, a fiber placement cell 1 may comprise a material storage enclosure 2, a material feeding/cutting station 8, a material transfer station 12, and a layup station 16.

A material storage enclosure 2 may have backing film receptacle 3 mounted to it. Material storage enclosure 2 may include an individual material spool assembly 4, swiveling roller assembly 5, backing film guide tube 6, and redirect roller assembly 7, for each tow to be produced per course. Each material spool assembly 4 may include a chuck device for securing the material spool to the support spindle and a device for controlling the back tension on the material being paid out. Material storage enclosure 2 may be equipped with a refrigeration system to maintain the material spools at the optimum temperature and humidity.

A material feeding/cutting Station 8 may be configured with a nip roller drive system 9, a cutting mechanism 10, and material guide trays 11.

Figure 6A:
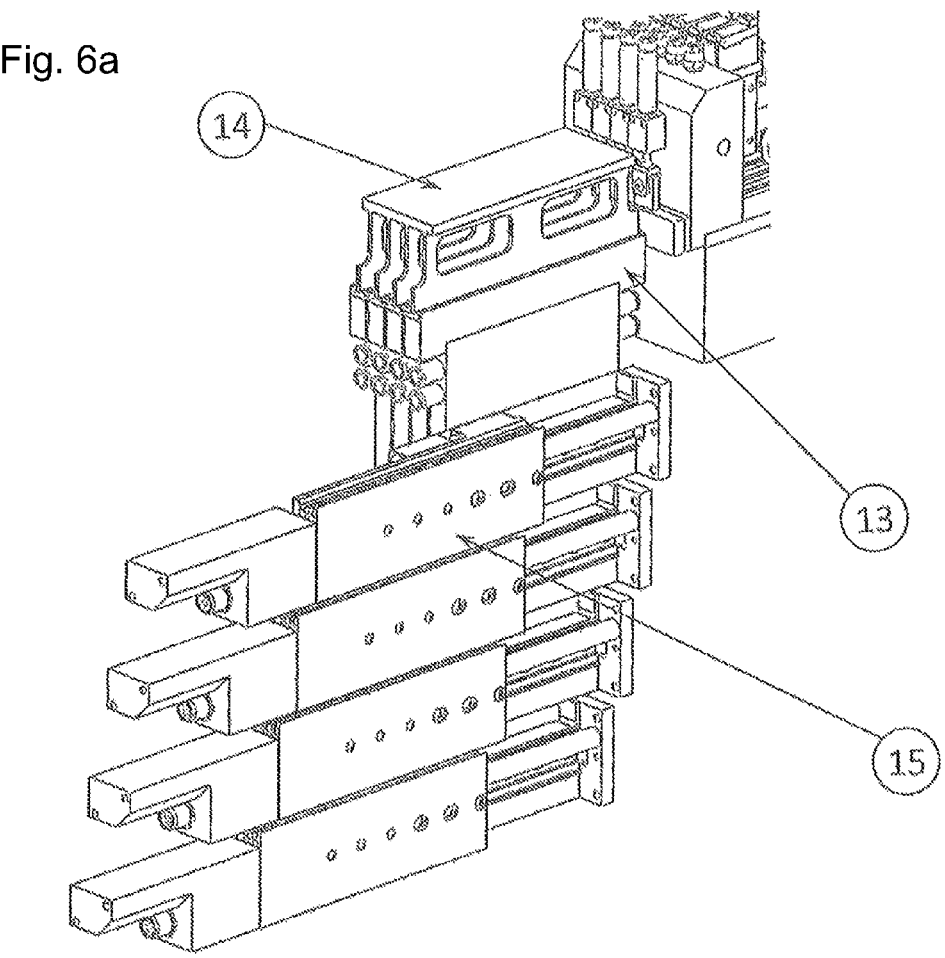
FIG. 6A is a schematic diagram of a detailed view of the material transfer station of FIG. 5.
Figure 6B:
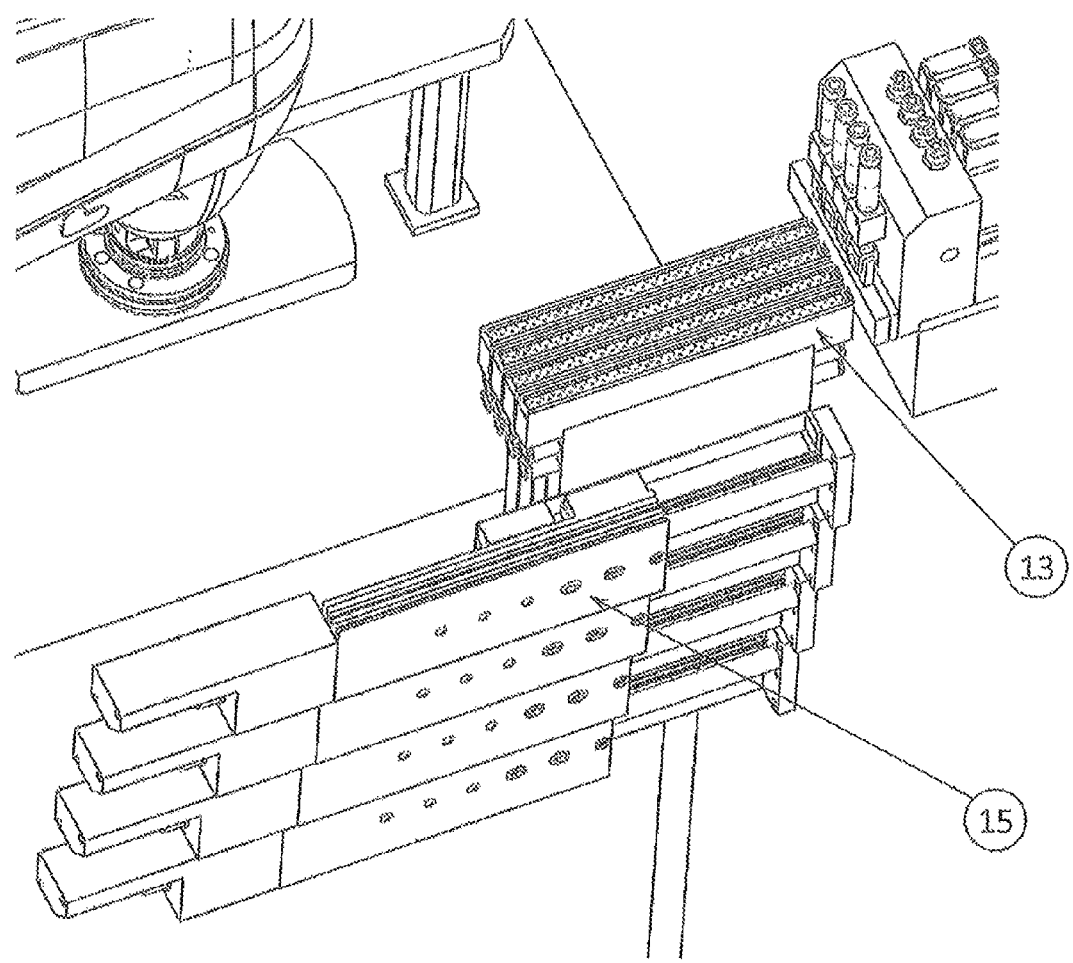
FIG. 6B is a schematic diagram of the material transfer station of FIG. 6A with the top guide removed for illustration purposes.
Figure 7:
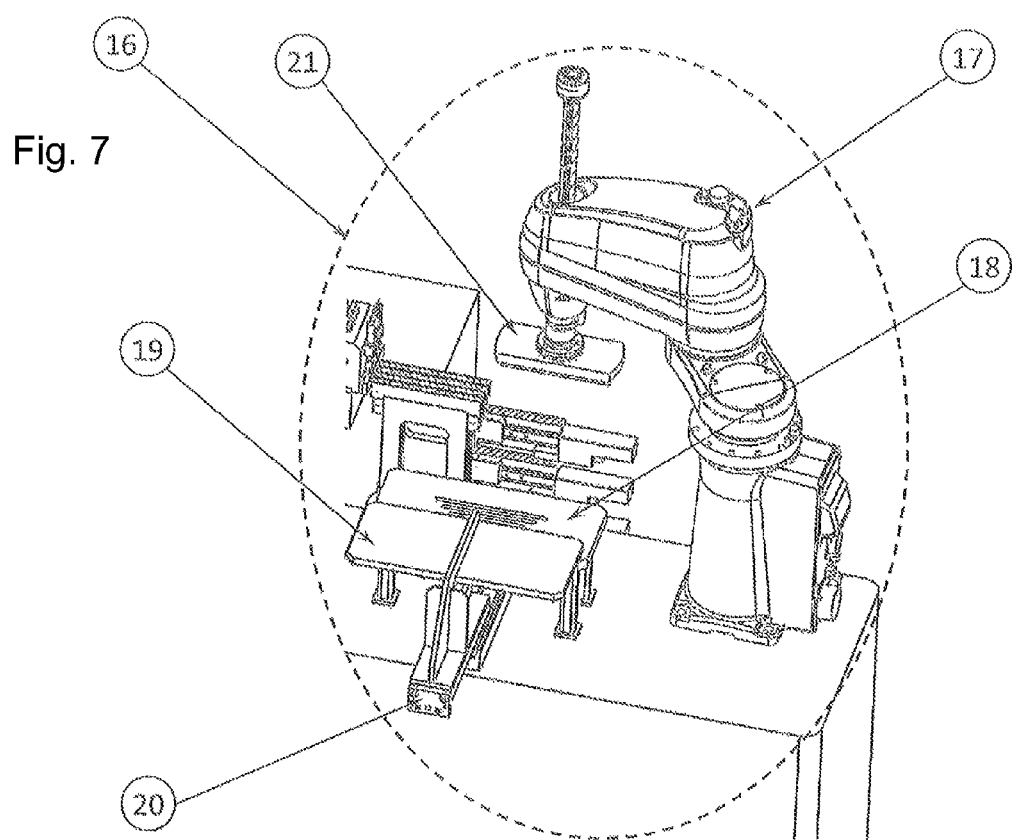
FIG. 7 is a schematic diagram of an exemplary layup station according to an embodiment.
Figure 8:
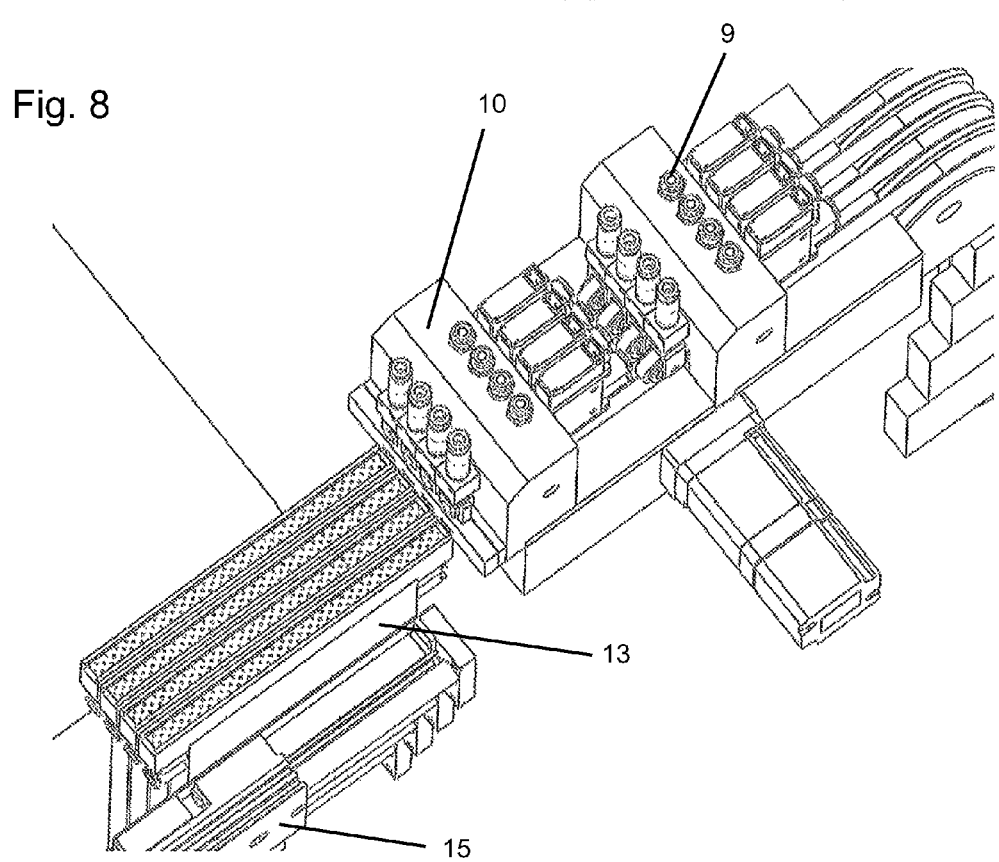
FIG. 8 is a schematic diagram illustrating an exemplary operation of a system for manufacturing an advanced composite component according to an embodiment.
Figure 9:
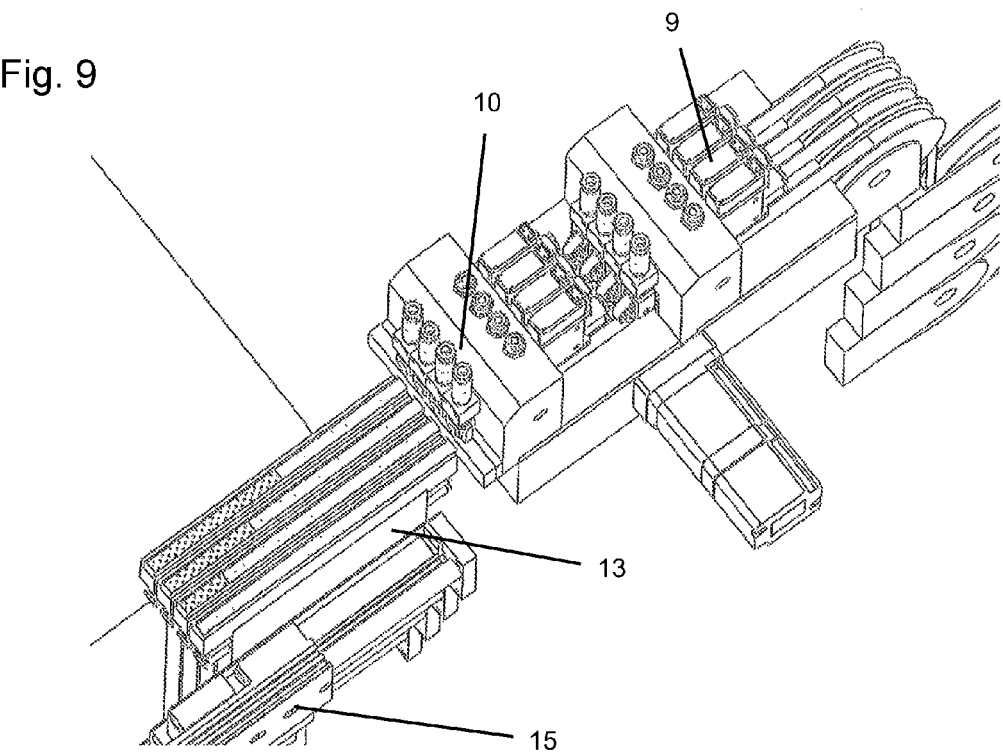
FIG. 9 is a schematic diagram illustrating an exemplary operation of a system for manufacturing an advanced composite component according to an embodiment.

As shown best in FIG. 6A, a material transfer station 12 may be configured with an individual, moveable guide tray 13, top guide 14, and individual servo-controlled linear actuator 15, for each tow to be produced per course. (Some of the figures, such as FIG. 6B, omit top guide 14 for illustration purposes.) The lateral spacing of moveable guide trays 13 with respect to one another may be equal to approximately 2× the width of the material employed in the system. This spacing may correspond to the position of every other tow in a given course to be laid up. Moveable guide trays 13 may be configured with vacuum ports for securing the material in position.

A layup station 16 may comprise a servo-controlled pick-and-place mechanism 17, a vacuum table/layup surface 18, a heating unit 19, and a linear actuator 20. Pick-and-place mechanism 17 may be equipped with a vacuum-operated gripper 21, which may be attached to its tool-mounting flange on its last axis of motion. The vacuum-operated gripper 21 may be configured with sufficient compliance to permit it to place material onto contoured surfaces.

Although the figures disclose embodiments configured to produce 4 tows per course, the number of tows to be produced per course may vary and thus may be configured to best suit the application parameters for the particular parts to be produced.

In embodiments, an exemplary system for manufacturing small advanced composite components operates as follows.

Nip roller drive system 9 may be activated and pull each lane of material 22 forward through its respective swiveling rollers 5 and redirect rollers 7. Each lane of material 22 may be pulled independently, so as to vary the length of each individual tow, as dictated by the part layup program.

Simultaneously with each lane of material 22 being pulled forward from its respective material spool by nip roller drive 9, the backing film 23 on each spool of material may be continuously stripped off and drawn into backing film receptacle 3 via backing film guide tube 6. Although a vacuum-operated backing film removal system is implied in the figures, the backing film removal operation may also be accomplished by winding the film onto a passive or powered take-up spindle or via any suitable alternative means.

Simultaneously with each lane of material 22 being pulled forward from its respective material spool by nip roller drive 9, each lane may be fed forward beyond cutting mechanism 10 and on into its respective guide tray 13, located in material transfer Station 8. Each lane may be fed the appropriate distance into its respective guide tray 13, which may correspond to the desired length of the tow, as dictated by the part layup program. As each lane of material 22 is fed forward into its respective guide tray 13, it passes beneath top guide 14, which provides Containment in the vertical direction, as shown, for example, in FIGS. 8-9 (top guide 14 not shown for clarity).

After each lane of material has been fed the desired distance into its respective guide tray 13, the vacuum system may be activated, causing each lane of material 22 to be held in position within its respective moveable guide tray 13.

With each lane of material 22 securely held in its respective moveable guide tray 13, cutting mechanism 10 may be actuated, severing each lane of material from the material being fed from the material supply spools and thereby creating individual tows 24.

Figure 10:
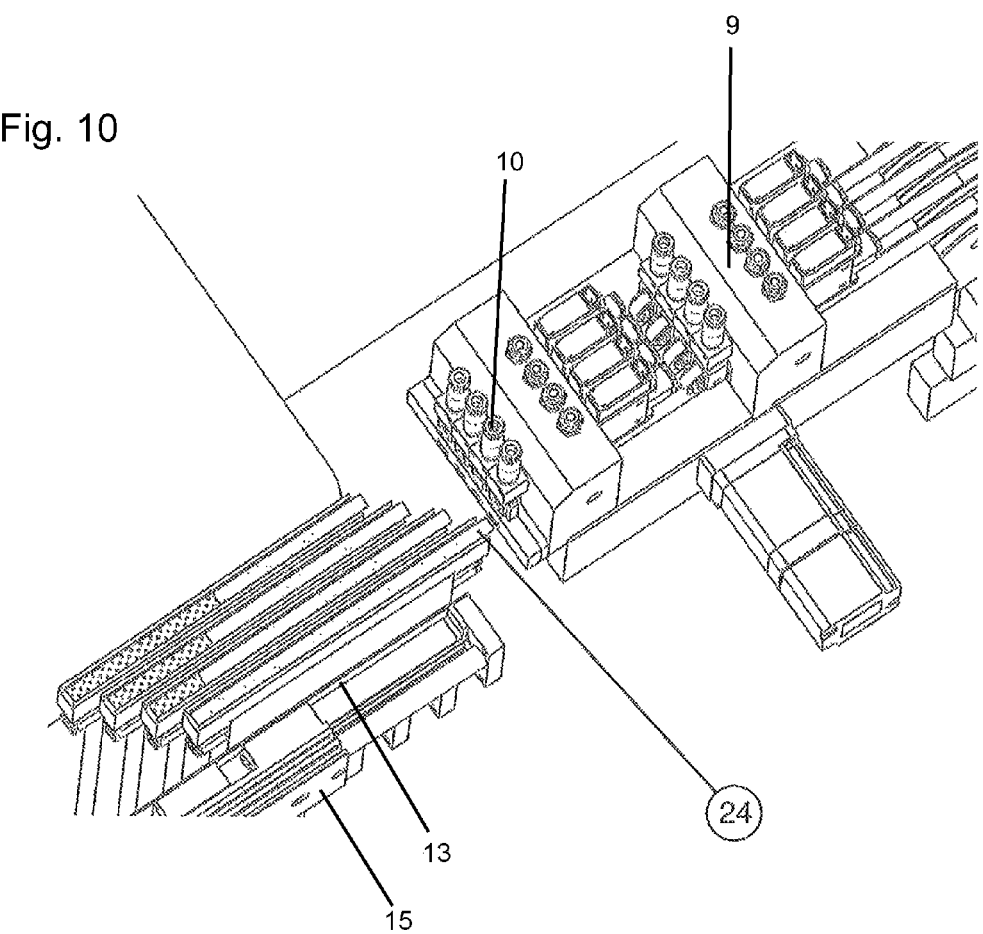
FIG. 10 is a schematic diagram illustrating an exemplary operation of a system for manufacturing an advanced composite component according to an embodiment.
Figure 11:
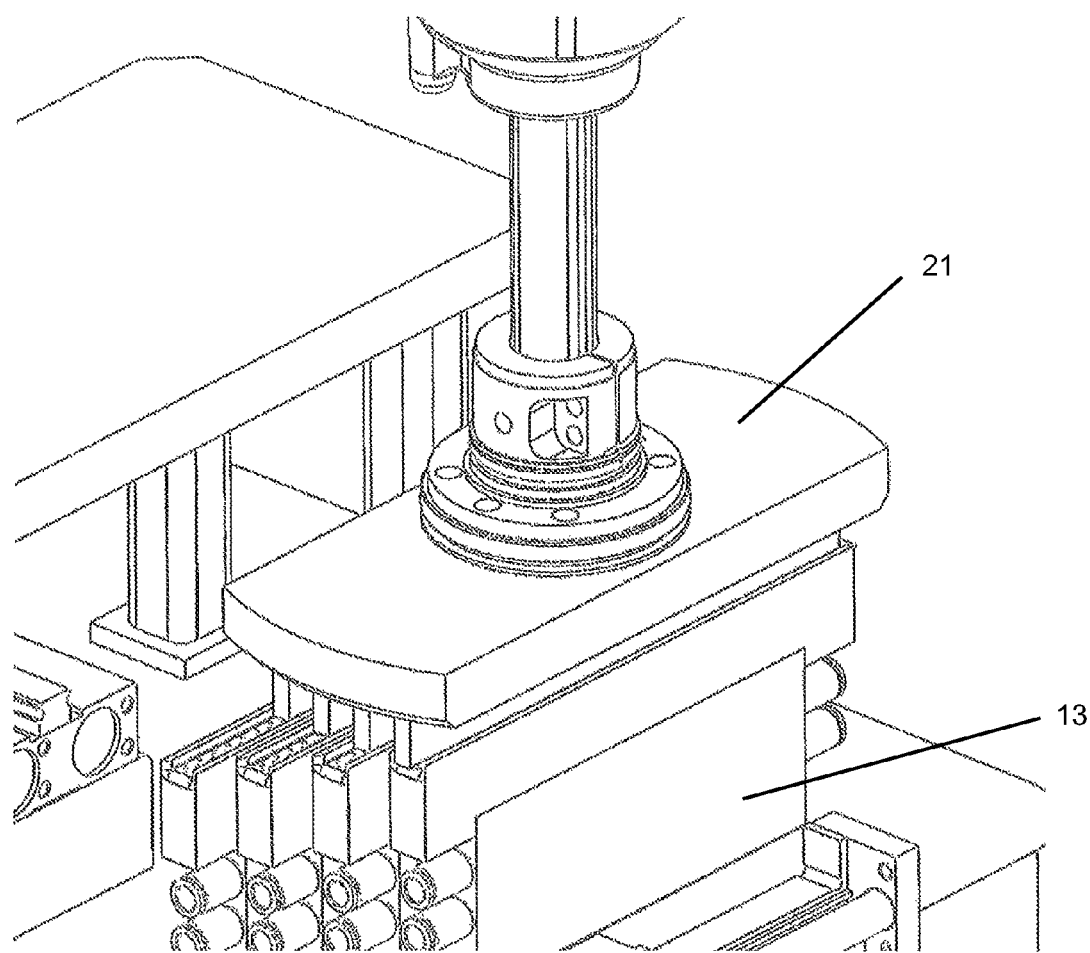
FIG. 11 is a schematic diagram illustrating an exemplary operation of a system for manufacturing an advanced composite component according to an embodiment.

With each individual tow 24 securely held in its respective moveable guide tray 13, linear actuators 15 may be activated and move each moveable guide tray 13 horizontally, in the direction away from cutting mechanism 10, as shown, for example, in FIG. 10. Each linear actuator 15 may move its respective moveable guide tray 13 independently to a discrete end position, such that:

All of the tows 24 are accessible by the pick-and-place device 17; and

The ends of each of the tows 24 are aligned in the same end-to-end relationship to one another as they are designed to be in the part being produced.

With all of the tows 24 positioned in the proper relationship to one another, pick-and-place device 17 may move into position above moveable guide trays 13 and vacuum-operated gripper 21 may be activated.

Figure 13:
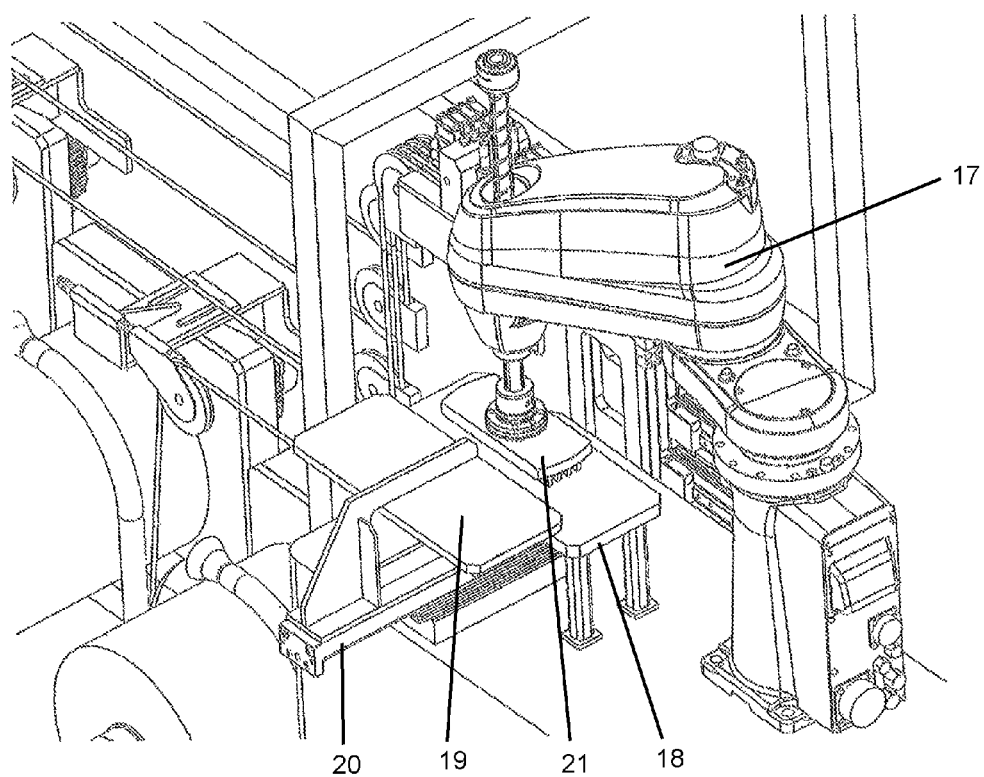
FIG. 13 is a schematic diagram illustrating an exemplary operation of a system for manufacturing an advanced composite component according to an embodiment.
Figure 14:
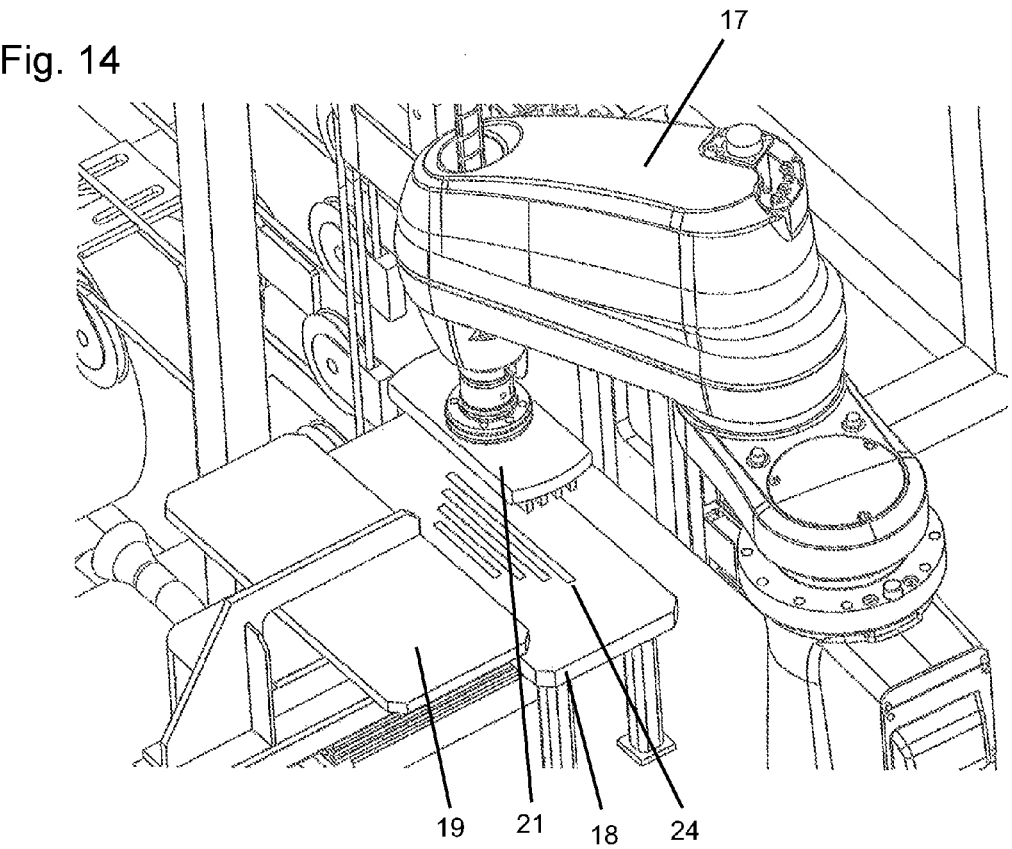
FIG. 14 is a schematic diagram illustrating an exemplary operation of a system for manufacturing an advanced composite component according to an embodiment.
Figure 15:
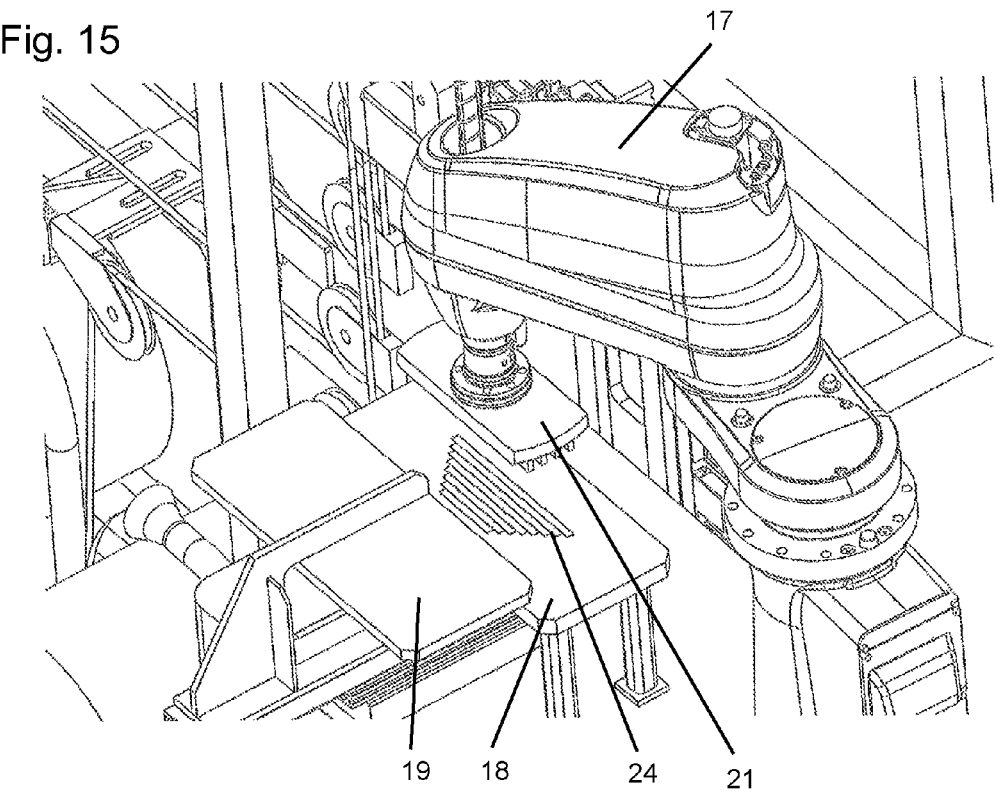
FIG. 15 is a schematic diagram illustrating an exemplary operation of a system for manufacturing an advanced composite component according to an embodiment.

In embodiments, for the first ply of material to be laid, the following operations may occur:

A carrier sheet may be placed onto the surface of vacuum table/layup surface 18 and the vacuum system may be activated to hold it in position;

The surface of the carrier sheet may be tackified in order to prepare it to receive the first ply of material;

The pick-and-place device 17 may rotate vacuum-operated gripper 21 into alignment with moveable guide trays 13, lower it into contact with tows 24 (see, for example, FIG. 11), and activate its vacuum;

The vacuum system in moveable guide trays 13 may be deactivated and pick-and-place device 17 may retract vacuum-operated gripper 21, so as to lift tows 24 away from moveable guide trays 13;

The pick-and-place device 17 may position vacuum-operated gripper 21 in the proper location and orientation above vacuum table/layup surface 18 (see, for example, FIG. 13);

The pick-and-place device 17 may lower vacuum-operated gripper 21 so as to place tows 24 into contact with the carrier sheet on vacuum table/layup surface 18 (see, for example, FIG. 14);

The pick-and-place device 17 may exert slight downward force to press tows 24 against the carrier sheet on vacuum table/layup surface 18 and vacuum-operated gripper 21 vacuum may be deactivated;

The pick-and-place device 17 may retract vacuum-operated gripper 21, leaving tows 24 in position on vacuum table/layup surface 18; and The pick-and-place device 17 may continue to lay courses of material in the manner described above until the first ply of the part has been completed.

Figure 12:
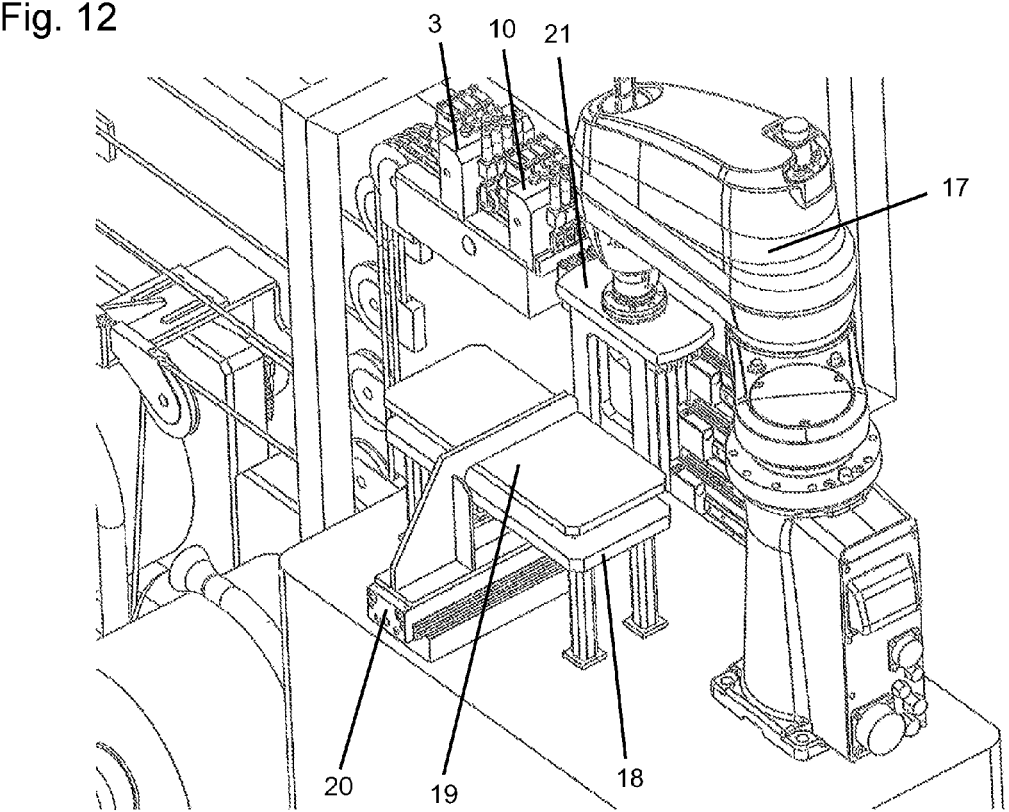
FIG. 12 is a schematic diagram illustrating an exemplary operation of a system for manufacturing an advanced composite component according to an embodiment.

In embodiments, for subsequent plies of material to be laid, the following operations may occur:

The pick-and-place device 17 may rotate vacuum-operated gripper 21 into alignment with moveable guide trays 13, lower it into contact with tows 24 (see, for example, FIG. 11), and activate its vacuum;

While the pick-and-place device 17 is in position above moveable trays 13, linear actuator 20 may be activated and move heater unit 19 into position above vacuum table/layup surface 18 (see, for example, FIG. 12);

The heater unit 19 may be energized so as to warm and tackify the surface of the previously laid ply of material on vacuum table/layup surface 18 (although a hot air heating system is implied in the concept figures, the heating operation may be accomplished with an infrared source or any suitable alternative means);

The vacuum system in moveable guide trays 13 may be deactivated and the pick-and-place device 17 may retract vacuum-operated gripper 21, so as to lift tows 24 away from moveable guide trays 13;

With the surface of the previously laid ply warmed and tackified, linear actuator 20 may once again be activated and retract heater unit 19 away from its previous position above vacuum table/layup surface 18 (see, for example, FIG. 13);

The pick-and-place device 17 may position vacuum-operated gripper 21 in the proper location and orientation above vacuum table/layup surface 18;

The pick-and-place device 17 may lower vacuum-operated gripper 21 so as to place tows 24 into contact with the previously laid ply on vacuum table/layup surface 18;

The pick-and-place device 17 may exert a slight downward force to press tows 24 against the previously laid ply on vacuum table/layup surface 18;

The vacuum-operated gripper 21 vacuum may be deactivated and the pick-and-place device 17 may retract it, leaving tows 24 in position atop the previously laid ply on vacuum table/layup surface 18 (see, for example, FIG. 15); and The pick-and-place device 17 may continue to lay subsequent courses of material in the manner described above until all plies of the part have been completed.

In embodiments described above, each course of material laid via the above methods may comprise every other tow position, i.e., each tow in a given course may be offset in the lateral direction from the adjacent tows, by a distance equal to the width of a Single tow (see, for example, FIG. 14). The next course produced may then comprise those tows required to fill in the gaps between the tows in the previously laid course (see, for example, FIG. 15).

In comparison to conventional fiber placement systems utilizing the same width and number of lanes of material, each course produced by embodiments described above may be 2× the width of the course produced by a conventional system; however, the actual net area of material placed on the layup surface may be similar or identical.

Alternative Embodiments

Many variants of the embodiments described above are also contemplated.

In one aspect, while embodiments described above may be configured to produce small parts, the embodiments are not limited to any particular size. Other embodiments may be configured to fabricate larger parts.

In another aspect, embodiments may use any pick-and-place mechanism. An industrial pick-and-place robot may comprise any of a number of pick-and-place configurations. Embodiments may include any means for removing tows from the guide trays 13 and locating them on the part being fabricated.

In another aspect, embodiments are applicable to any width of tape, and are not limited to narrow tape widths. Embodiments may use configurations similar to those disclosed herein to fabricate parts made with wider tape.

In another aspect, the cutter may be configured to cut the ends of the material at an angle or curve in order to parts with less edge waste.

In another aspect, a system may include more than one material storage enclosure 2, material feeding/cutting stations 8, material transfer station 12, layup station 16, or elements therein in order to increase speed or productivity. For example, a machine may be configured with two material storage enclosures 2 and material feeding/cutting mechanisms 8 so that the pick-and-place system 17 may pull material from one system while the other is being fed. Or, each material storage enclosure 2 may be set up to process different widths of tape so that two widths of tape may be used within a single part.

In addition, in situations where a part needs to be debulked during layup, multiple tooling surfaces may be included so that the pick-and-place device 17 may place material on a second part while a first part is being debulked.

In another aspect, pick-and-place device 17 may be configured with a tool-changer such that the vacuum-operated gripper 21 may be removable from the pick-and-place device 17 and other end-effectors may be attached. The attachment system may be, for example, a vacuum chuck. Other end effectors may be specialized vacuum-operated grippers designed to place particular types of courses or to place courses on particular areas of a part, such as an area that does not have a constant thickness. Other end-effectors may include, but are not limited to:

- A gripper that removes the part from the tooling surface;
- A gripper that places a carrier material onto the tool surface upon which the part will be laid up;
- A gripper that places inserts or other material as needed by the part design (an example of such an insert would be a woven glass fiber isolation ply placed on both outer surfaces of the part);
- An inspection system that inspects each ply for quality assurance; and
- A debulking frame that may be placed over the part and vacuum applied to compress the part and remove entrapped air.

In another aspect, instead of laying material directly onto the vacuum table, a carrier material may be secured to the tooling surface (such as a polymer film) by vacuum or other means. The first ply of the part may be adhered to this carrier material by any suitable method, such as heat, tackifier, or pressure.

In another aspect, embodiments may produce a non-flat part. While embodiments described above use a flat tooling surface, curved parts may also be laid up using a gripper 21 that would allow the tape to conform to a non-flat part. A simple curve may involve a compliant gripper surface that may conform to the part shape while compressing the tows onto the tool surface. More complex shapes may use more sophisticated grippers that can bend or actuate to reshape the flat tows into the final part shape.

In another aspect, embodiments described above may also be applied to the layup of thermoplastic prepreg composite material. In a thermoplastic configuration, material storage enclosure 2 may not have to be refrigerated and may omit film-backing receptacle 3. Alternate heating methods, such as laser, hot gas, infrared, or ultrasonic heating may be used in order to heat the material rapidly to a temperature that would allow the plies to adhere together during layup. In addition, rather than heating the surface of the already-laid material in order to promote adhesion to the next course of material, pick-and-place device 17 or vacuum-operated gripper 21 may include ultrasonic welders to weld the course being laid up to the underlying plies. Embodiments of suitable welding methods are disclosed in U.S. Pat. No. 8,048,253, which is herein incorporated by reference in its entirety.

In another aspect, present embodiments for manufacturing small advanced composite parts may be combined with other layup methods where a hybrid process would benefit a specific part geometry. For example, for parts that have a large length-to-width aspect ratio where the plies whose courses run parallel to the long edge of the part are much longer than the plies whose courses run at an angle to the long edge, the long courses may be placed by another means. Alternative means may include, but are not limited to, hand placement of pre-cut plies of tape material for the long courses, using pick-and-place device 17 to place long strips with an appropriate vacuum-operated gripper 21, or placing tape with a traversing head for the long courses.

The present embodiments may lead to several surprising and beneficial results.

In one aspect, with embodiments configured to place precut tows rather than feeding and cutting on the fly, physical space limitations of the placement of the cutting mechanism may be relaxed, thereby permitting the system to utilize a very short minimum course length (MCL). The amount of scrap generated may be minimized, thus offering a viable alternative to the hand layup process for small parts.

In another aspect, with embodiments configured to place precut tows rather than feeding and cutting on the fly, the need for an expensive and sophisticated tension control system may be eliminated, thereby reducing the cost of a system according to the present embodiments.

In another aspect, with embodiments configured with a stationary material storage enclosure and stationary feeding/cutting station, the need for a complex and expensive fiber delivery system may be eliminated, along with much of the stress imposed on the material by the bending and twisting associated with such systems.

In another aspect, with embodiments configured with a stationary material storage enclosure and stationary feeding/cutting station, most of the material path may be contained within a refrigerated enclosure, thereby reducing the tackiness of the material and thus the amount of resin transfer to the components throughout the system. This may offer the potential for reduced frequency of periodic cleaning while enhancing the reliability of a system.

In another aspect, with embodiments configured to place precut tows on a flat layup surface, the size, complexity, and thus cost of a manipulator appropriate for the system is greatly reduced.

In another aspect, with embodiments configured to place precut tows on a flat layup surface, the need to heat/tackify the previously laid plies on the fly may be eliminated. A lower capacity and thus less expensive heating system may be employed without the need for sophisticated controls.

The foregoing disclosure of the embodiments has been presented for purposes of illustration and description. It is not intended to be exhaustive or to limit other embodiments to the precise forms disclosed. Many variations and modifications of the embodiments described herein will be apparent to one of ordinary skill in the art in light of the above disclosure. The scope of the embodiments is to be defined only by the claims, and by their equivalents.

Further, in describing representative embodiments of the present embodiments, the specification may have presented the method and/or process of the present embodiments as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present embodiments should not be limited to the performance of their steps in the order written, and one skilled in the art can readily appreciate that the sequences may be varied and still remain within the spirit and scope of the present embodiments.

The construction and arrangements of the system for manufacturing advanced composite components, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, image processing and segmentation algorithms, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

What is claimed is:

1. A method of manufacturing a plurality of tows per course using a fiber placement system comprising at least one material storage enclosure, wherein for each tow to be produced per course, the material storage enclosure includes a material spool assembly having a material wound thereon, a swiveling roller assembly, and a redirect roller assembly; at least one material feeding/cutting station including a cutting mechanism; at least one material transfer station, wherein for each tow to be produced per course, the material transfer station includes a moveable guide tray equipped with a vacuum system; and at least one layup station including a vacuum table/layup surface, and a pick-and-place device equipped with an end-effector, the method comprising the steps of:
    pulling each lane of material forward through its respective swiveling rollers and redirect rollers so that each lane of material is fed forward beyond the cutting mechanism and on into its respective guide tray located in the at least one material transfer station;
    after each lane having been fed a desired distance into its respective guide tray, activating the vacuum system of each respective moveable guide tray, causing each lane of material to be held in position;
    after causing each lane of material to be held in position in its respective moveable guide tray, actuating the cutting mechanism for severing each lane of material from the material being fed from the material supply spools and thereby creating individual tows;
    with each lane of material held in position in its respective moveable guide tray, moving the moveable guide trays horizontally, in a direction away from cutting mechanism, thereby making all of the tows accessible by the pick-and-place device;
    rotating the end-effector of the pick-and-place device into alignment with the moveable guide trays;
    lowering the end-effector into contact with the tows;
    activating the end-effector;
    deactivating the vacuum system in the moveable guide trays;
    retracting the end-effector of the pick-and-place device, so as to lift the tows away from the moveable guide trays;
    positioning the end-effector of the pick-and-place device above the vacuum table/layup surface;
    lowering the end-effector of the pick-and-place device so as to place the tows into contact with a previously laid ply on the vacuum table/layup surface;
    deactivating the end-effector of the pick-and-place device; and
    retracting the end-effector of the pick-and-place device, leaving the tows in position atop the previously laid ply on vacuum table/layup surface.

2. The method according to claim 1, wherein the end-effector is a vacuum-operated gripper, and wherein for activating and deactivating the end-effector the vacuum is activated and deactivated, respectively.

3. The method according to claim 1, wherein after lowering the end-effector of the pick-and-place device so as to place the tows into contact with the previously laid ply on the vacuum table/layup surface, the pick-and-place exerts a downward force to press the tows against the previously laid ply on the vacuum table/layup surface.

4. The method according to claim 1, wherein each lane of material is pulled independently from its respective material spool assembly, and each lane of material is fed a distance into its respective guide tray, which corresponds to a length of the tow, as dictated by a part layup program.

5. The method according to claim 1, wherein the at least one layup station further comprises a heater unit, and wherein the method further comprises the steps of:
    while the pick-and-place device is in position above the moveable trays, moving the heater unit into a position above the vacuum table/layup surface, and energizing the heater unit so as to warm and tackify the surface of the previously laid ply of material on the vacuum table/layup surface; and
    with the surface of the previously laid ply warmed and tackified, retracting the heater unit away from its position above the vacuum table/layup surface, prior to positioning the vacuum-operated gripper of the pick-and-place device above the vacuum table/layup surface.

6. The method according to claim 1, wherein when moving the moveable guide trays horizontally, in the direction away from cutting mechanism, each moveable guide tray is moved independently to a discrete end position, so that the ends of each of the tows are aligned in the same end-to-end relationship to one another as they are designed to be in the part being produced.

7. The method according to claim 1, wherein, for at least one course of material to be laid, each tow is offset in the lateral direction from the adjacent tows by a distance equal to the width of a single tow, and wherein gaps between the tows are filled by laying tows in a next course of material to be laid.

8. The method according to claim 1, wherein for a first course of material to be laid, there are performed the steps:
  placing a carrier material onto the surface of the vacuum table/layup surface and activating the vacuum system to hold the carrier in position;
  tackifying the surface of the carrier material in order to prepare it to receive the first ply of material;
  rotating the end-effector of the pick-and-place device into alignment with the moveable guide trays;
  lowering the end-effector into contact with the tows, activating the end-effector;
  deactivating the vacuum system in the moveable guide trays;
  retracting the end-effector of the pick-and-place device, so as to lift the tows away from the moveable guide trays;
  positioning the end-effector of the pick-and-place device above the vacuum table/layup surface;
  lowering the end-effector of the pick-and-place device so as to place the tows into contact with the carrier material on the vacuum table/layup surface;
  deactivating the end-effector of the pick-and-place device;
  exerting a downward force by the pick-and-place device to press the tows against the carrier material on the vacuum table/layup surface;
  deactivating the end-effector of the pick-and-place device;
  retracting the end-effector of the pick-and-place device, leaving the tows in position atop the carrier material on the vacuum table/layup surface; and
  repeating the steps until the first ply of the part has been completed.

9. The method according to claim 1, wherein each lane of material is pulled independently, via a nip roller drive system, from its respective material spool assembly, and each lane of material is fed a distance into its respective guide tray, which corresponds to a length of the tow, as dictated by a part layup program.

10. A method of manufacturing a plurality of tows per course using a fiber placement system comprising at least one material storage enclosure, wherein for each tow to be produced per course, the material storage enclosure includes a material spool assembly having a material wound thereon, a swiveling roller assembly, and a redirect roller assembly; at least one material feeding/cutting station including a cutting mechanism; at least one material transfer station, wherein for each tow to be produced per course, the material transfer station includes a moveable guide tray equipped with a vacuum system; and at least one layup station including a vacuum table/layup surface, and a pick-and-place device equipped with an end-effector, the method comprising the steps of:
  independently pulling the material wound on each material spool assembly forward through its respective swiveling roller assembly and redirect roller assembly, so that the material wound on each material spool assembly is fed forward beyond the cutting mechanism into its respective moveable guide tray located in the material transfer station;
  after the material wound on each material spool assembly is fed a desired distance into its respective moveable guide tray, activating the vacuum system of each respective moveable guide tray, causing the material to be held in position in its respective moveable guide tray;
  after causing the material to be held in position in its respective moveable guide tray, actuating the cutting mechanism to sever the material from its respective material spool assembly, thereby creating one of the plurality of tows;
  with the material held in position in its respective moveable guide tray, moving the moveable guide trays horizontally, in a direction away from the cutting mechanism, thereby making all of the plurality of tows accessible by the pick-and-place device;
  rotating the end-effector of the pick-and-place device into alignment with the moveable guide trays;
  lowering the end-effector into contact with the plurality of tows;
  activating the end-effector;
  deactivating each vacuum system of each moveable guide tray;
  retracting the end-effector of the pick-and-place device, so as to lift the plurality of tows away from the moveable guide trays;
  positioning the end-effector of the pick-and-place device above the vacuum table/layup surface;
  lowering the end-effector of the pick-and-place device so as to place the plurality of tows into contact with the previously laid ply on the vacuum table/layup surface;
  deactivating the end-effector of the pick-and-place device; and
  retracting the end-effector of the pick-and-place device, leaving the plurality of tows in position atop the previously laid ply on vacuum table/layup surface.

* * * * *